Jan. 16, 1923.  
F. H. BÜKER.  
BLASTING TOOL.  
FILED JUNE 11, 1920.  
1,442,645.
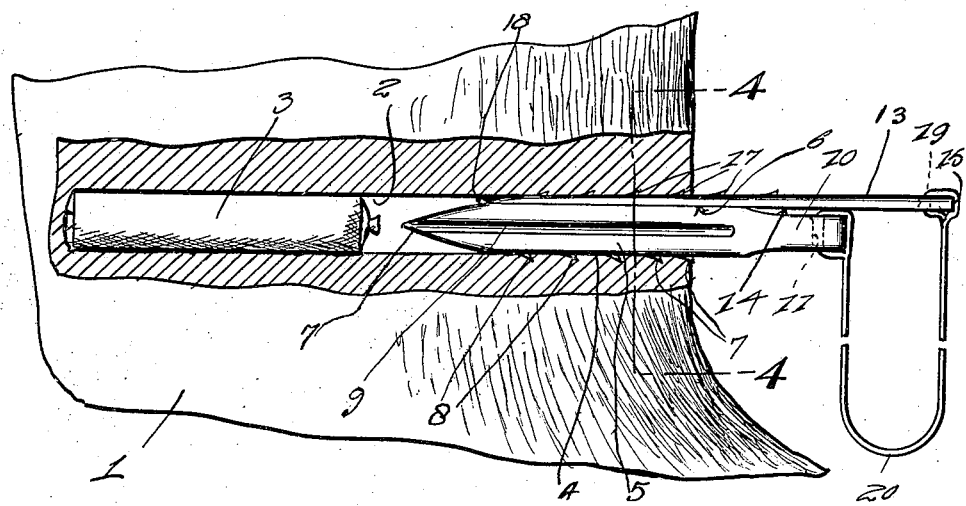
Fig. 1.
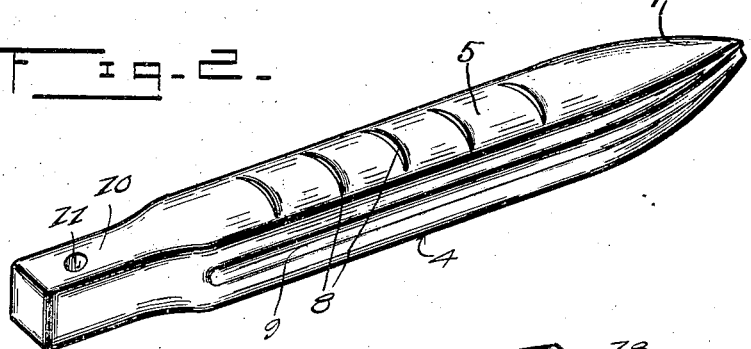
Fig. 2.
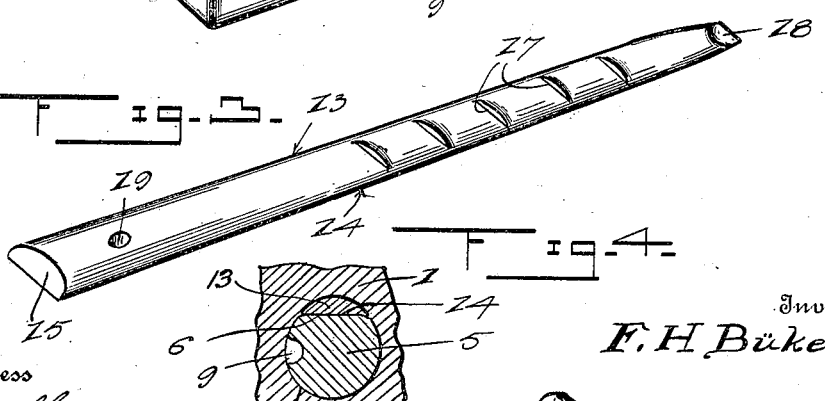
Fig. 3.
Fig. 4.
Witness  
C. R. Beale.  
Inventor  
F. H. Büker,  
By  
Attorney Patented Jan. 16, 1923.

1,442,645

UNITED STATES PATENT OFFICE.

FRED H. BÜKER, OF GREENWOOD, WISCONSIN.

BLASTING TOOL.

Application filed June 11, 1920. Serial No. 388,385.

*To all whom it may concern:*

Be it known that I, FRED H. BÜKER, a citizen of the United States, residing at Greenwood, in the county of Clark and State of Wisconsin, have invented certain new and useful Improvements in Blasting Tools; and I do hereby declare the following to be a full, clear, and exact description of the invention, such as will enable others skilled in the art to which it appertains to make and use the same.

This invention has relation to certain new and useful improvements in blasting tools and its primary object is to provide a plug to close the discharge opening in a tree stump or the like after the charge has been placed therein so as to utilize the maximum power from the explosion of the charge.

The invention also aims to provide a plug which will effectually close the discharge opening and yet permit the insertion of the necessary fuse along one side so that the charge may be fired in the usual manner.

The invention further aims to provide a plug which will be constructed so as to effectually fill the end of the charge opening by contact of the plug with the walls thereof so as to effectively retain the plug in position during explosion of the charge.

The invention still further aims to provide tools of the character stated in which the said plug may be retained in proper position by means of a wedging member.

With the foregoing and other objects in view, the invention consists in the novel construction, combination and arrangement of elements as hereinafter more specifically set forth, claimed and shown in the accompanying drawings forming a part of the present application and in which:

Figure 1 is a fragmentary view partly in section of a tree stump showing my improved blasting tool applied thereto.

Figure 2 is a detail perspective view of the plug employed.

Figure 3 is a detail perspective view of the wedging member employed, and

Figure 4 is a sectional view taken on line 4—4 of Figure 1.

Referring more in detail to the drawings in which similar reference characters designate corresponding parts throughout the several views, 1 indicates a tree stump in which a hole is drilled to receive a charge 3 of dynamite or similar high explosive.

The plug is designated by the numeral 4 and comprises an elongated body 5 substantially round in cross section so as to conform to the charge opening 2. Plug 4 is flattened or oblate, as shown at 6, and its inner end is preferably pointed at 7, so that the plug may be readily driven into the opening 2. The body 5 has a plurality of suitably disposed transverse spurs or teeth 8 projecting therefrom having rearwardly directed biting edges and inclined side faces. The teeth 8 penetrate the tree at opening 2 and prevent withdrawal of the plug 4. Plug 4 is provided with a longitudinal groove 9 in one side face which extends from the reduced outer end of the plug 4 to the inner end 7 thereof so that a suitable fuse and fuse cap may be inserted therethrough, after insertion of the plug, to reach the charge 3.

In order to retain the plug in tight relation with the wall at opening 2, a wedge or fastening key 13 is used having a flat face 14 which is slidable along face 6 and the opposite face of which is arcuate and has spurs 17 similar to spurs 8, extending therefrom to enter the stump. Hammer blows may be applied to outer end 15 of the key to drive it into place. Openings 11 and 19 are provided in the plug and wedge, respectively adjacent their outer ends, and a flexible connecting member 20 is secured therein. Wedge 13 is preferably reduced at its front end 18 to facilitate insertion.

The outer end of plug 4 is reduced as at 10 to prevent flat contact of the wedge and plug and thus prevent interference of member 20 with relative movement of the plug and wedge.

In use, the charge is first placed in opening 2. Thereupon the plug is driven therein. Key 13 is next driven into place. A fuse is then inserted through groove 9 and ignited to fire the charge. The explosion drives the plug and wedge out of the stump. They are always recovered however, joined by member 20, and usually within fifteen feet of the explosion, ready for reuse.

While the preferred embodiment of the invention has been shown and described, minor changes in the details of construction and arrangement of parts may be resorted to within the scope of what is claimed.

What is claimed is:—

A blasting device consisting of a filling plug for insertion into a charge-containing opening, said plug having a substantially flat outer wall extending parallel to its longitudinal axis and substantially the full length of the plug, a fastening key for the plug adapted for insertion into said opening and being slidable along said wall, means independent of a support connecting the key and plug for relative movement thereof, the end of the plug being reduced to accommodate interposition of the connecting means between and flat contact of the plug and key, the key being longer than said walls to facilitate manipulation and to extend beyond the outer end of the plug when applied so as to disaline the points of fastening of said connecting means to the plug and key, respectively.

In testimony whereof I affix my signature in presence of two witnesses.

FRED H. BÜKER.

Witnesses:
H. W. STABNOW,
P. J. PLAUTZ.